United States Patent [19]

Kryder et al.

[11] Patent Number: 5,528,564
[45] Date of Patent: Jun. 18, 1996

[54] DIRECT OVERWRITE MAGNETO-OPTIC SYSTEM FOR STRIP ERASING AND RECORDING ELONGATED DOMAINS

[75] Inventors: Mark H. Kryder; Han-Ping D. Shieh, both of Pittsburgh, Pa.

[73] Assignee: Movid Information Technology, Inc., Schenectady, N.Y.

[21] Appl. No.: 641,315

[22] Filed: Jan. 14, 1991

Related U.S. Application Data

[63] Continuation of Ser. No. 154,844, Feb. 10, 1988, abandoned, which is a continuation-in-part of Ser. No. 33,931, Apr. 3, 1987, abandoned, which is a continuation of Ser. No. 837,130, Mar. 7, 1986, Pat. No. 4,679,180.

[51] Int. Cl.$^6$ ............................. G11B 11/10; G11B 13/04
[52] U.S. Cl. ............................................................. 369/13
[58] Field of Search ............................... 369/13, 14, 100, 369/109, 124, 111; 360/59, 60, 66, 114; 365/122

[56] References Cited

U.S. PATENT DOCUMENTS

| | | |
|---|---|---|
| 3,949,387 | 4/1976 | Chaudhari et al. |
| 3,965,463 | 6/1976 | Chaudhari et al. |
| 4,419,750 | 12/1983 | Howe ........................ 369/116 |
| 4,495,530 | 1/1985 | Yanagida ................... 360/114 |
| 4,569,881 | 2/1986 | Freese et al. |
| 4,649,519 | 3/1987 | Sun et al. |
| 4,701,881 | 10/1987 | Tanaka et al. ............. 365/122 |
| 4,785,438 | 11/1988 | Mazunoe .................. 365/122 |
| 4,939,713 | 7/1990 | Satoh et al. ............... 369/124 |

FOREIGN PATENT DOCUMENTS

| | | | |
|---|---|---|---|
| 57-78653 | 5/1982 | Japan | ........................ 369/13 |
| 58-50639 | 3/1983 | Japan | |
| 59-113507 | 6/1984 | Japan | |
| 59-113506 | 6/1984 | Japan | |
| 60-101702 | 6/1985 | Japan | ........................ 369/13 |
| 61-50235 | 3/1986 | Japan | |
| 61-190740 | 8/1986 | Japan | |

OTHER PUBLICATIONS

"Thermomagnetic Writing in Gd-Co Sputtered Films" by S. Matsushita, K. Sunago and Y. Sakurai, *IEEE Transactions on Magnetics*, vol. MAG-11 No. 5, Sep. 1975.
"Optical Memories Eye Computer Markets" by E. Rothchild, *High Technology*, Feb. 1984.
"Operating Margins for Magneto-Optic Recording Materials With Direct Overwrite Capability" by H. P. D. Shien and M. H. Kryder, *IEEE Transactions on Magnetics*, vol. MAG-23 No. 1, Jan. 1987.
"Direct Overwrite in Amorphous Rare-Earth Transition Metal Alloys" by P. Hansen, Appl. Phys. Lett. 50(6), Feb. 9, 1987.
Technical Conference Handout, "Overwrite System of Magneto Optical Disk System" from Nippon Kogaku K. K., paper presented International Symposium on Magneto-Optics, Kyoto, Japan, Apr. 1987.
"Performance of Magneto-Optical Recording Media With Direct Overwrite Capability", by M. D. Schultz, H. P. D. Shieh and M. H. Kryder, J. App. Phys. 63, p. 3844 (1988), presented at the Magnetism and Magnetic Materials Conf., Chicago, Ill., Nov. 9-12, 1987.
"Magneto-Optic Recording Investigations" by M. Schultz and M. Kryder, published in the Carnegie Mellon University Magnetic Technology Center Annual Report for 1987 and 1988 and available since Aug. 1988 and presented before MTC personnel in Apr. 1988.
Braat et al, "High density magneto-op recording", proceedings of SPIE The International Society for Optical Engineering, vol. 420, pp. 201-214.

*Primary Examiner*—Hoa T. Nguyen
*Attorney, Agent, or Firm*—Morgan & Finnegan

[57] ABSTRACT

Methods and apparatus are provided for recording, erasing and reading elongated magnetic domains on magneto-optic media using laser energy. Recording and erasing can be carried out in the absence of a reversible external magnetic bias field. The preferred magneto-optic media to be used have compensation temperatures higher than about 40° C. Recording and erasing are carried out using either continuously or intermittently energized lasers.

30 Claims, 4 Drawing Sheets

FIG. 1A
FIG. 1B

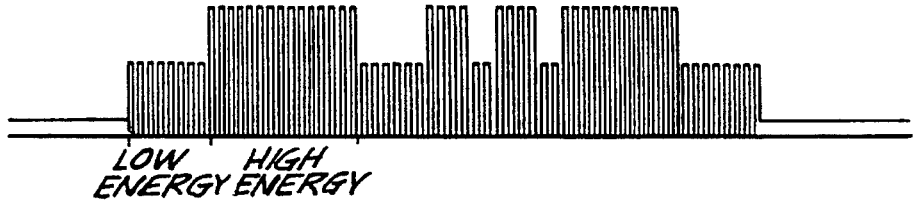

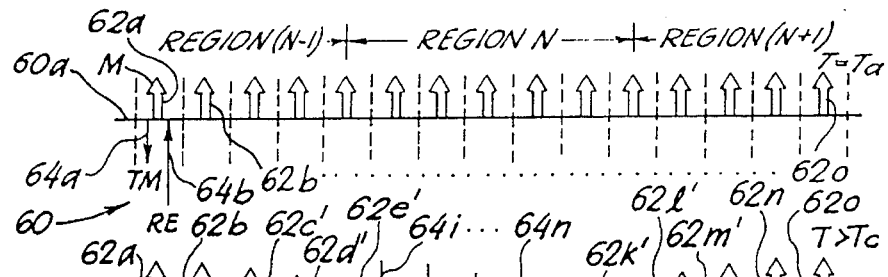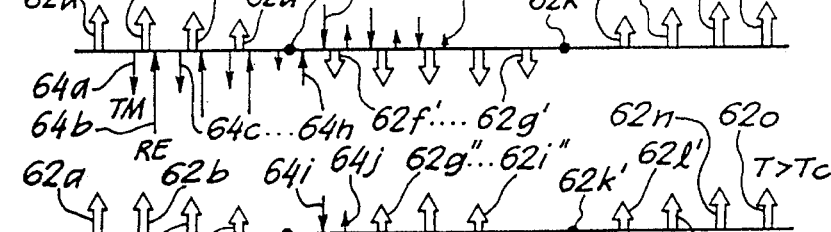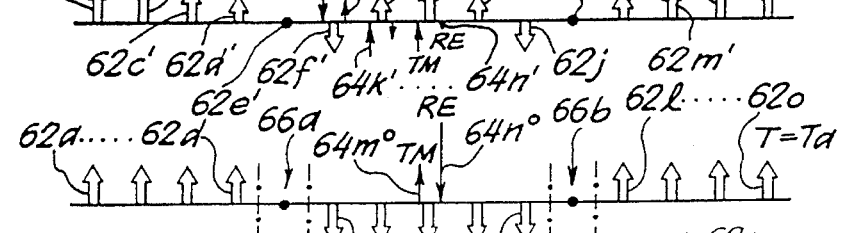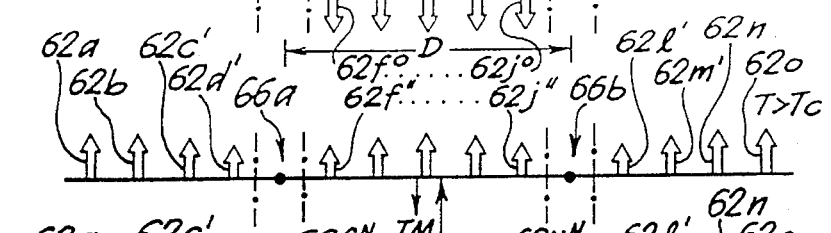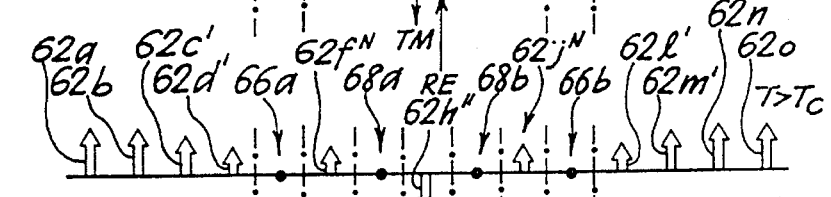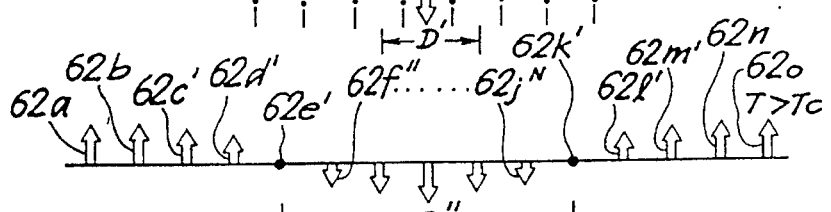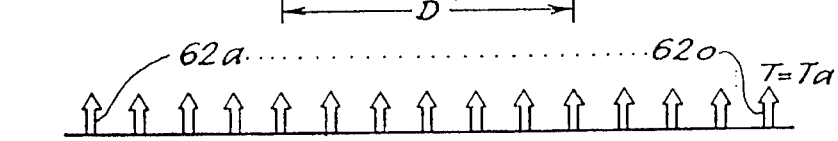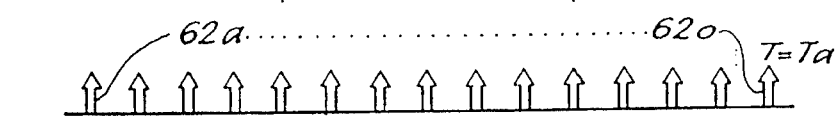

DIRECT OVERWRITE MAGNETO-OPTIC SYSTEM FOR STRIP ERASING AND RECORDING ELONGATED DOMAINS

RELATED APPLICATIONS

This is a continuation of application Ser. No. 07/154,844, filed on Feb. 10, 1988, now abandoned, which is a continuation-in-part of application Ser. No. 033,931, filed Apr. 3, 1987, now abandoned, which in turn is a continuation of application Ser. No. 837,130, filed Mar. 7, 1986, (now U.S. Pat. No. 4,679,180).

The present invention relates to magneto-optic recording and erasing of magnetic domains and, more particularly, to magneto-optic compensation point operation without external magnetic bias.

BACKGROUND OF THE INVENTION

Thin film, ferrimagnetic materials such as rare earth-transition amorphous alloys of terbium iron cobalt (TbFeCo), gadolinium terbium cobalt (GdTbCo) and gadolinium terbium iron cobalt (GdTbFeCo) have been known as high-density, magneto-optic recording media. Magnetic domains on the order of one micrometer in size can be recorded in the magneto-optic material. These ferrimagnetic materials have high coercivity at room temperature and low coercivity at high temperatures. The recording medium, preferably in a coated disk form, can be magnetized in a particular direction perpendicular to the surface by heating the disk in the presence of an external magnetic field, and then permitting the disk to cool or by applying a saturating magnetic field. Data can thereafter be stored on the disk by heating a small spot (preferably by laser energy) in the presence of an external magnetic field of the desired magnetic polarity. The heated area is magnetized in the direction of the external magnetic field when the area cools and returns to the high coercivity state at room temperature. Data on the disk is "read" by noting the effect on polarized light reflected off the disk surface.

Magneto-optic recording systems operating without external magnetic bias are also known. Compensation point systems operating without magnetic bias developed by some of the inventors hereof use a magneto-optic medium with a compensation temperature a few tens of degrees C. above room temperature and preferably at least 50° C. below the Curie point temperature. A stable magnetic domain can be recorded on such a medium by heating a local area above the compensation point using a laser beam and by relying upon the magnetic self bias to invert the magnetic polarity within the domain. The domain can subsequently be erased by applying a lower energy level laser pulse to create a domain within the previously recorded domain. If the internal domain is created at the correct laser pulse energy level, the internal domain wall tends to expand as the surrounding domain wall tends to contract until the domain walls annihilate one another, thereby erasing the previously recorded domain.

Curie point systems operating without external magnetic bias are also known, but operate on a significantly different principle. The magneto-optic medium must have a relatively low Curie point, preferably in the range of 80° C. to 180° C. If an area is heated above the Curie temperature, the heated area loses its magnetization and, upon cooling, forms a stable domain of reverse magnetic polarity at approximately one-half the radius of the area heated above the Curie point. To erase a previously recorded domain, the previously recorded domain area is heated above the Curie point and the magnetization of the heated area disappears. If the erase pulse is small and just sufficient to heat the area of the prior domain above the Curie point, the domain of reverse magnetic polarity that tends to form upon cooling is unstable and therefore collapses upon cooling.

Biasless systems operating without external magnetic bias do not suffer from the time lag required with changing magnetic fields, and therefore such biasless systems are capable of extremely high operating speeds. Such biasless systems also avoid the need for bulky magnetic components close to the recording medium.

In the previously known systems the recorded domains were thought to stabilize within cylindrical domain walls corresponding to the lowest energy configurations. See, for example, "The Theory of Cylindrical Magnetic Domains" by A. A. Thiele from the Bell System Technical Journal Vol. 48, No. 10, December, 1969. The mobility of magnetic domains resulted in the development of magnetic "bubble" memories. In creating a magnetic domain, if the applied thermal energy is too low, the domain will collapse. If the applied thermal energy exceeds a minimum threshold level (and is not too large), a domain is established which expands. There are several counteracting forces affecting the dynamics of domain formation which tend to form the domain at a minimum energy level configuration.

SUMMARY OF THE INVENTION

It has been found that in dynamic systems stable domains can be created in elongated or strip configurations using biasless recording. With a rotating disk medium, if the correct amount of heat energy is applied by means of a laser beam moving across the surface, an elongated strip domain is created which does not break up into discrete domains. The elongated strip domains can be recorded by continuous energizations of the laser beam or by closely-spaced pulse energization of the laser. Such elongated strip domains are particularly useful in pulse-length modulated and run-length-limited coded recordings which can significantly increase the recorded data density on the recording medium.

It has also been found, surprisingly, that a continuously energized laser beam moving across the disk surface at a lower energy level than that used to "write" a strip domain, erases any domain in the path of the beam. Alternatively, a similar erase operation can be achieved by discrete low energy "erase" pulses spaced at distances less than one-half the minimum anticipated domain width or diameter.

A preferred method of operation utilizing the newly-discovered technique is to continuously energize the laser at the "erase" level whenever data is being recorded and to superimpose thereon the higher "write" level whenever a domain is to be recorded. With this technique the desired data is recorded with a single laser pass across the medium regardless of the prior magnetic history of the medium. Another preferred technique is to energize the laser at the continuous "erase" level when recording and to superimpose the closely spaced "write" pulses thereon when strip domains are desired. Yet another technique is to energize the laser at a fixed power level such that continuous energization is at the correct power level for writing and such that the duty cycle of the pulsed laser achieves erasing. Still another alternative is to normally apply closely spaced "erase" pulses, and increase the amplitude of the closely spaced pulses to the "write" level where a domain is desired.

For the purposes of this application, "elongated domains" are those where the length of the domain in the direction of the track is at least 1.5 times the width and "strip erase" erases domains in an area along the track at least 1.5 times the track width.

BRIEF DESCRIPTION OF THE DRAWINGS

FIGS. 1A–1F are a series of illustrations showing various methods of controlling the laser to achieve elongated domains and strip erasing;

FIGS. 2a–2h are graphical representations of net magnetic moments of several adjacent data bit storage regions, at times before, during and after two successive changes in stored value.

DETAILED DESCRIPTION OF THE PRESENTLY PREFERRED EMBODIMENTS

Figure 1:
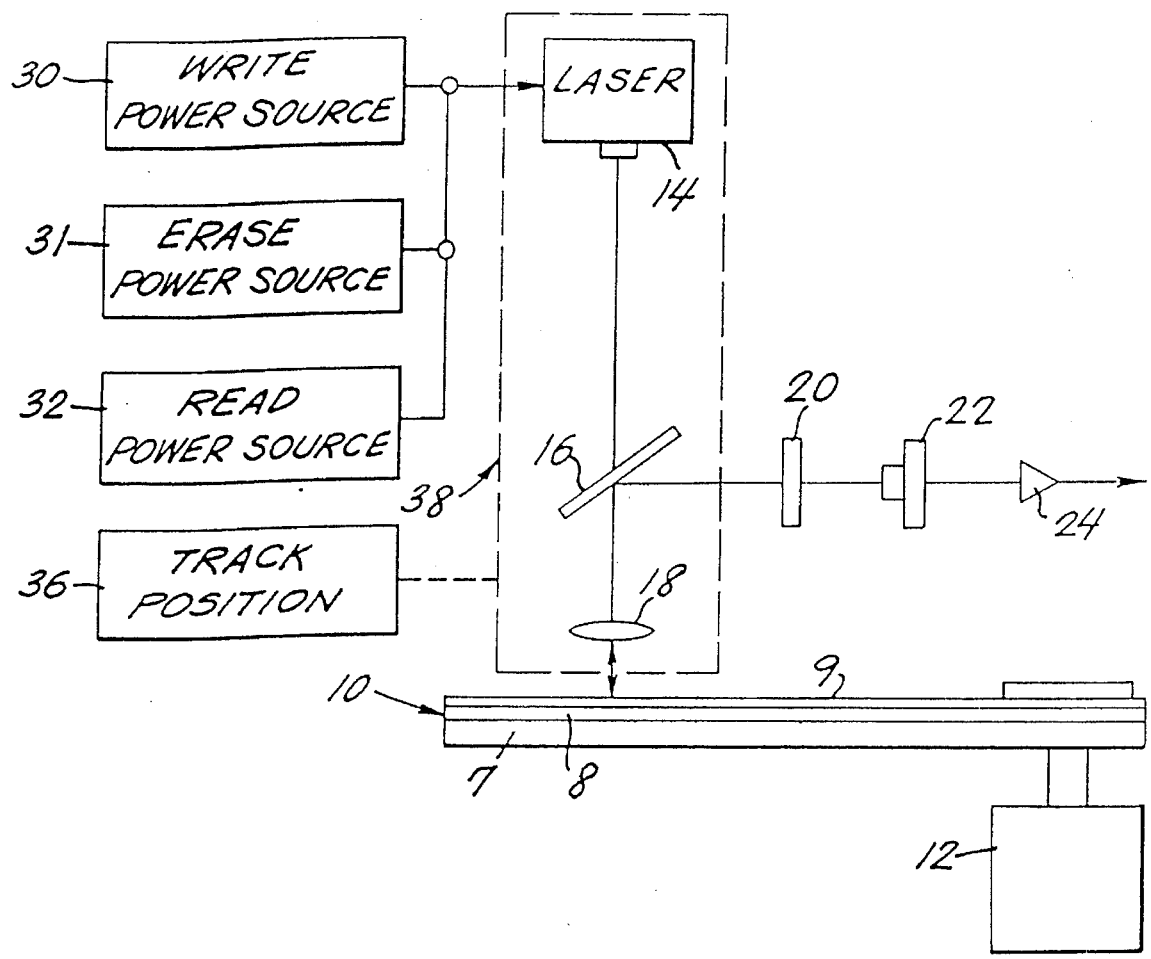
FIG. 1 is a diagram illustrating a magneto-optic recording disk and the apparatus to read, erase and over-write digital data recorded on the disk.

FIG. 1 is a schematic illustration of the compensation point magneto-optic recording system for writing elongated domains and for strip erasing. The magneto-optic recording medium is on the surface of a disk 10 which is rotated by a suitable drive motor 12. A laser source 14 provides a polarized beam of laser energy directed toward the disk surface passing through a half-silvered mirror 16 and a lens 18. Light reflected from the disk surface passes through lens 18, is reflected off mirror 16, and then passes through a polarizer 20 to a photo detector 22 which in turn supplies a signal to an amplifier 24 indicating the amount of light received. Laser 14, mirror 16 and lens 18 make up a head unit 38 which can be selectively positioned at different distances from the center of disk 10 corresponding to different recording tracks by means of a track positioning mechanism 36.

Disk 10 includes a magneto-optic recording medium 8 placed on a substrate 7 by sputtering or like processes. The recording surface is overcoated with an optically-transparent protective layer 9 such as silicon oxide. Other suitable overcoat materials include silicon nitride, aluminum nitride, titanium oxide and zirconium oxide. The substrate is made of aluminum, glass (such as Corning glass types 0211 or 7059) or polycarbonate and glass substrates coated with photo-polymer layers.

The recording layer is fabricated of a ferrimagnetic magneto-optic material, such as an alloy of gadolinium terbium cobalt (GdTbCo), terbium cobalt (TbCo), terbium iron cobalt (TbFeCo) and the like, which has a compensation temperature $T_c$ preferably higher than the highest expected ambient temperature $T_a$, but much less than the crystallization temperature of the alloy (above 300° C.). Compensation temperatures should be at least a few tens of degrees C. above the normal room temperature. Experimental work has established that magnetic domains in ferrimagnetic materials can be erased without magnetic bias according to the compensation point technique of this invention in materials with a compensation temperature in the range of 40° C. to 140° C. Erasure, although possible, does not work reliably outside this range. The preferred range of compensation temperatures is 60° C. to 100° C. The Curie temperature should be at least 150° C. and at least 50° C. above the compensation point and preferably at least 100° C. above the compensation point. In-plane hysteresis, which may be caused by oxidation, should be avoided.

In general it is known that the compensation temperature of a ferrimagnetic recording medium is a function of the ratio of the two types of magnetic materials. In rare earth-transition metal, magneto-optic formulations, the compensation temperature is a function of the rare earth to transition metal ratio. If more than one rare earth is included in the formulation, the compensation temperature is approximately independent of the ratio of the rare earths. In formulations including iron, such as gadolinium terbium iron cobalt (GdTbFeCo), the compensation temperature is approximately independent of the iron/cobalt (Fe/Co) ratio. In formulations in which cobalt is the transition metal, about 77% cobalt yields a compensation temperature of 50° C., whereas about 75.8% cobalt yields a compensation temperature of 100° C.

Preferred formulations (in atomic %) tested in the laboratory are as follows:

(1) $Tb_{25} Fe_{55} Co_{20}$ having a compensation temperature of 80° C., a Curie temperature of 330° C., and a coercivity $H_c$ of 4 kilo-oersteds at 27° C.

(2) $Gd_{13} Tb_{13} Fe_{59} Co_{15}$ having a compensation temperature of 90° C., a Curie temperature of 330° and a coercivity $H_c$ of 2.5 kilo-oersteds at 27° C.

(3) $Tb_{19.5} Co_{80.5}$ having a compensation temperature of 120° C., a Curie temperature over 400° and a coercivity $H_c$ of 1.8 kilo-oersteds at 27° C.

After fabrication, the disk is subjected to a saturating magnetic field of about 20 k-Oersteds to provide an initial magnetic state. Upon cooling, under the influence of the external field, the region assumes a net magnetic moment directed in the same direction as the bias field.

As shown in FIG. 1, laser 14 is energized by one of three power sources 30–32, or alternatively by a single source at different selected levels or different duty cycles. For lower cost units operating at low to moderate disk speeds, semiconductor diode lasers, such as the SHARP LT 024MDD diode laser which operates at 782 mm wavelength and up to 20 milliwatts power, are preferred. Another suitable diode laser is HLP 1400 operating at 820 mm wavelength available from Hitachi. For systems requiring more power for operating at higher disk velocities, an argon gas laser can be used. With a diode laser, energization for an interval of 10 nanoseconds to 1 microsecond with power levels on the order of 1–20 milliwatts is used to affect the magnetic state of the recording medium during "write" and "erase" operations, whereas a lower power level which does not alter the magnetic state of the medium is used for "read" operations. Nucleating micrometer size spot domains in a gadolinium terbium cobalt (GdTbCo) film, for example, is achieved by locally heating the film using write power source 30 with seven milliwatts of laser power for a 300 nanosecond pulse duration without an externally applied magnetic field. A spot domain written with a pulse of 300 nanoseconds duration can be completely erased by a succeeding pulse of 100–200 nanoseconds duration at the same power level from erase power source 31. With 12 milliwatts of laser power, a spot domain written with a 100 nanosecond pulse can be erased by a 30–80 nanosecond pulse; a spot domain written with a 150 nanosecond pulse can be erased with a 35–130 nanosecond pulse; and a spot domain written with a 200 nanosecond pulse can be erased with a 45–175 nanosecond pulse.

Lens 18 should be configured to focus the beam, at the half power diameter thereof, to an area having a diameter somewhat less than the diameter of the region to be heated.

In both writing and erasing in accordance with this invention, the object in selecting the laser pulse power is to heat an area above the compensation point without significant heating above the Curie temperature. Thus, localized heating raises the temperature above the compensation point, and causes a localized decrease in the coercivity, of substantially only a limited region into which data is to be written.

The data written on a track of disk 10 can be non-destructively read therefrom by causing a reading light beam of linearly-polarized light from laser 14, energized by read power source 32 (of amplitude insufficient to heat an area to a temperature high enough that the magnetization changes), to be projected toward the disk surface. In the reflected beam, polarization is rotated in a direction dependent upon the direction of the net magnetic moment. The polarization of the reflected beam can therefore be analyzed to determine the binary state of the data stored in the region being read.

The present invention facilitates elongated domain recording and strip erasing of previously written information in selected regions of the magneto-optic medium. The method employs the self demagnetizing field created within a reheated region by the specially formulated thin film magneto-optic recording medium (with a compensation temperature in the range of 40° to 140° C.) to reverse the net magnetization of the region and thus eliminate the requirement for an externally applied bias magnetic field. The physical processes believed to be involved will be described hereinafter in conjunction with FIGS. 2a–2h. In general, when a sufficiently large region is heated above the compensation point to lower the coercivity of the region, the demagnetizing field creates a stable domain of reverse magnetic polarity when the region cools. To erase a previously recorded domain, a lower energy laser beam is used to create a domain within the prior domain. The new domain expands and draws in the surrounding domain wall until the domain walls annihilate one another, thereby erasing the domains.

Surprisingly, it has been found that this compensation point technique is capable of strip erasing, i.e., capable of reliably erasing all magnetic domains in the path of the laser beam regardless of prior magnetic history. The laser beam must be operated at a medium power level not sufficient to create a stable domain, but sufficient to create a domain which will expand to annihilate previously recorded domains. The laser can be operated continuously at the medium power level or can be energized to produce closely spaced laser pulses. It has also been found that the compensation point technique is capable of recording elongated strip domains. These elongated strip domains can be achieved by continuously operating the laser at a higher power level or by using closely spaced pulses at the higher power level. Strip erasing has the advantage of erasing any domain in the path of the beam, and in effect recording a "0" state, regardless of prior magnetic history and without requiring accurate positioning relative to the prior domains being erased. Strip erasing in combination with strip recording of elongated domains permits the use of pulse-width-modulated or run-length-limited, coded recording techniques which significantly increase the data density that can be recorded along a track.

A glass disk of 130 mm diameter and 1.2 mm thickness was coated (100 nanometers) with a Gd Tb Fe Co formulation with a target compensation temperature in the range of 60°–120° C. Tests were conducted using the compensation point technique on tracks located at 45–50 mm from the center which had a track speed of about 3 meter/sec. A SHARP semiconductor laser operating at 782 nm wavelength was energized continuously at 5.5 milliwatts for strip erasing and was energized continuously at 8.0 milliwatts for the duration of elongated strip domain recording. Strip erasing was also achieved using 8.0 milliwatt peak laser power at 5–6 megahertz using a 50% duty cycle. Generally, the preferred laser power level increases with increases in the compensation temperature of the recording medium and increases with increases in the thickness of the recording medium. The preferred power level also increases with increases in the linear speed.

For strip erasing using pulsed energization of the laser, the laser pulses should be spaced at less than one half the minimum anticipated domain diameter (or domain width). With this spacing the laser produces at least two erase pulses while any recorded domain passes the erase station. By pulsing the laser in this manner at the medium erase power level, any domains along the path, whether discrete or elongated, are erased. A similar spacing should be used when recording elongated strip domains using a pulsed laser. With such a close spacing of pulses, the individual domains being formed coalesce into an elongated strip domain as long as laser pulses are applied at the higher power level used for recording domains and are applied sufficiently close in time to create a progressive heated area.

Figure 1C:
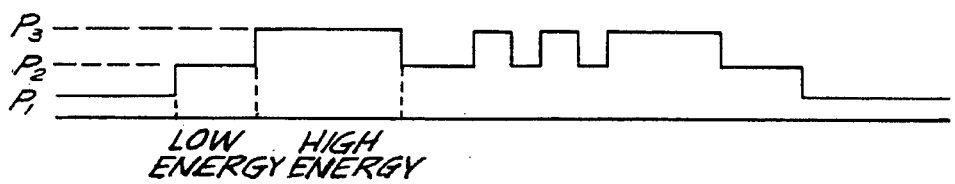
Figure 1D:
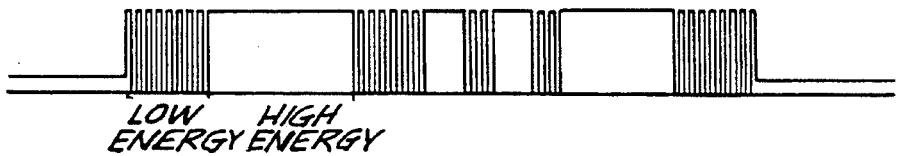
Figure 1E:
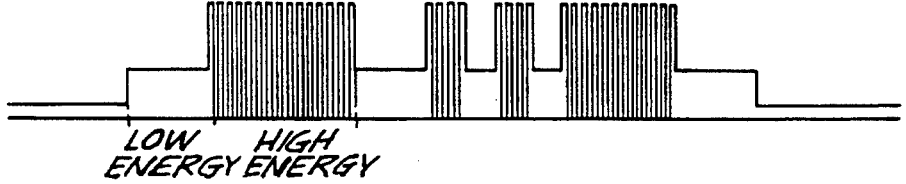
Figure 1F:

Four methods of using the strip erase and recording technique according to the invention are illustrated in FIGS. 1A–1F. Assume that data recorded along a track is as shown in FIG. 1A wherein the magnetic state is normally in the "0" state and the shaded areas represent recorded domains of opposite magnetic polarity in the "1" state. Further assume that it is desired to overwrite a portion of the track as indicated so that the recorded data appears as indicated in FIG. 1F.

One method for changing the data employs continuous energization of the laser as shown in FIG. 1B. Where overwrite is not desired, the laser is energized at a low power level used for reading data where the power level is insufficient to affect the recorded data. During the overwrite segment the laser is operated either at the medium power level $P_2$ for erasing or at the higher power level $P_3$ for writing. Whenever the laser operates at power level $P_2$, the medium is erased to record a "0" state; and whenever the laser operates at the higher power level $P_3$, a domain of reverse polarity is recorded for the "1" state.

Figure 3A:
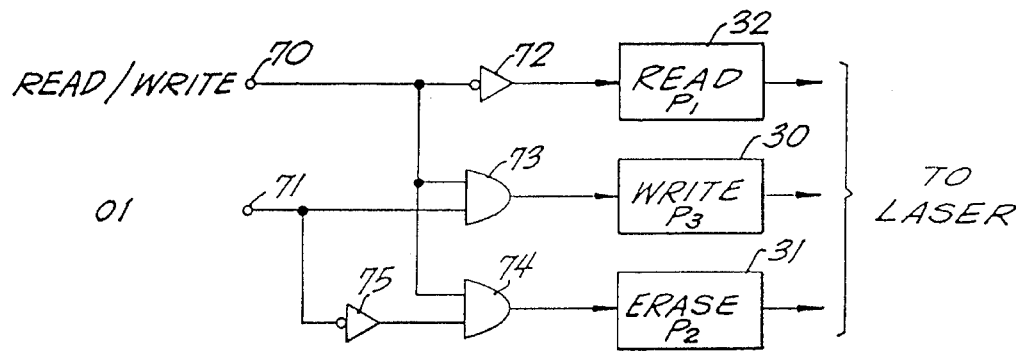
FIGS. 3A–3D are logic block diagrams illustrating control arrangements according to various methods according to the invention.

Operation according to the method illustrated in FIG. 1B can be achieved using logic control circuits illustrated schematically in FIG. 3A. A terminal 70 receives the "read/write" control signal with the zero level corresponding to "read" and the high level corresponding to "write". A terminal 71 receives that data control with the zero level corresponding to "0" and the high level corresponding to "1". Terminal 70 is connected to read power source 32 via an inverter 72 and is connected to write power source 30 and erase power source 31 via AND gates 73 and 74, respectively. Terminal 71 is coupled to write power source 30 via AND gate 73 and is coupled to erase power source 31 via an inverter 75 and AND gate 74. A "read" signal (zero level at terminal 70) produces a high signal at the output of inverter 72 to activate read power source 32 to energize the laser at a low level $P_1$. A "write" signal at terminal 70, on the other hand, condition AND gates 73 and 74 to pass through the data information from terminal 71. If a high signal is present at terminal 71 (corresponding to a "1"), this signal passes through AND gate 73 to activate write power source 30 to energize the laser at the high power level $P_3$. If a zero level signal is present at terminal 71 (corresponding to a "0"), inverter 75 produces a signal that passes through AND gate 74 to activate erase power source 31 to energize the laser at the medium power level. Another method for overwriting the data is illustrated in FIG. 1E wherein laser pulses are used during the overwrite operation. Pulses at the medium power level are used to erase and record the "0" state whereas pulses at the higher power level are used to record discrete elongated domains indicating the "1" state. The two power levels can be achieved by using pulses of two different power levels using the same frequency and duty cycle as shown. Alternatively, a constant peak power level can be employed and the duty cycle varied to change the power level.

Figure 3B:
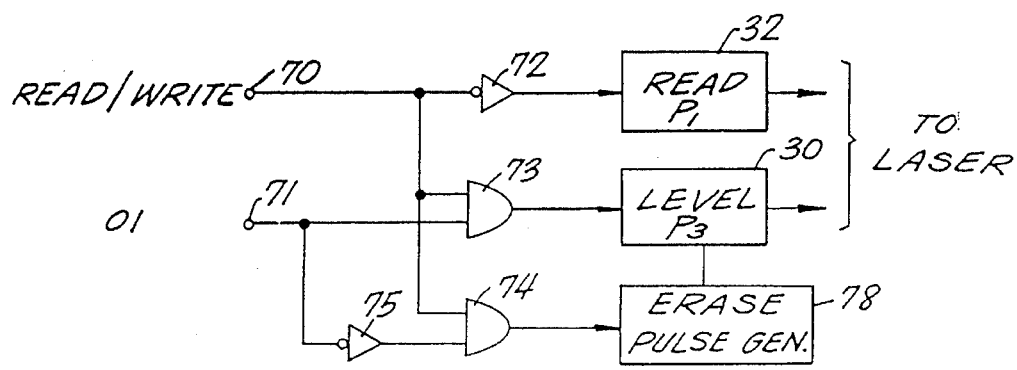
Figure 3C:
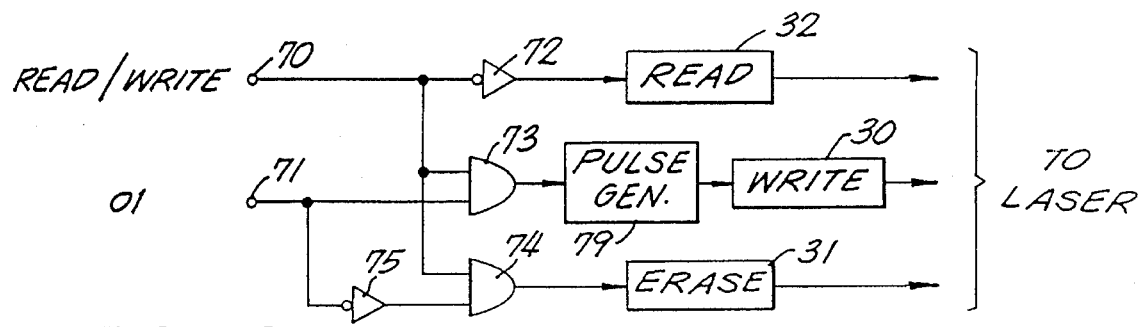
Figure 3D:
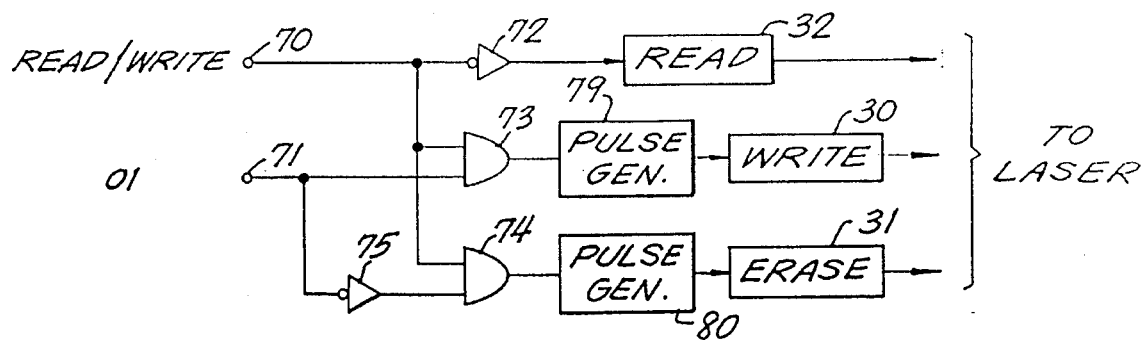

Operation according to FIG. 1E may be achieved using control circuits as illustrated schematically in FIG. 3D. Instead of connecting the outputs of AND gates 73 and 74 to power sources 30 and 31 as was the case in FIG. 3A, AND gate 73 is coupled to power source 30 via a pulse generator 79, and AND gate 74 is coupled to power source 31 via a pulse generator 80. The pulse repetition rate for the pulse generators must be sufficiently high to achieve overlap of successive heated areas above the compensation temperature in the recording medium, on the order of at least 5 megahertz and preferably higher. The power level of sources 30 and 31 should be adjusted according to the duty cycle of the pulse generators.

Other methods for overwriting the data, which are hybrids of the above methods, are illustrated in FIGS. 1C and 1D. In FIG. 1C erasing is achieved by pulsing the laser, and writing is achieved by continuous laser excitation. The laser operates at the same peak power for the erase and write operation with the lower power level for the erase operation being achieved by appropriate adjustment of the duty cycle. In FIG. 1D, the laser is continuously energized at the medium level for the erase operation and is pulsed at a higher power level for the write operation.

Operation according to the methods according to FIGS. 1C and 1D may be achieved using control circuits as illustrated in FIGS. 3B and 3C, respectively. In FIG. 3C a pulse generator is coupled between AND gate 73 and the write power source 30. In FIG. 3B an erase pulse generator 78 is connected to the output of AND gate 74, and the erase pulse generator 78 is connected to activate the same power source 30 used for the "write" operations. The erase pulse generator should have a duty cycle of about 50% to reduce the laser power level to the medium range suitable for erase operations.

The process that appears to be physically occurring for the self-inverting data over-write method (using the apparent self-demagnetizing field of the thin-film magneto-optic recording media) is illustrated in FIGS. 2a–2h. Prior to the time at which a first over-write operation is to occur, the media layer 60 is at an ambient temperature Ta less than the compensation temperature Tc of the magneto-optic material. The recording regions each contain one bit of a first set of data. FIG. 2a illustrates that, for the starting data set with the same data value, e.g., a binary one state, in each of three sequential regions (N−1), N, and (N+1), the net magnetic moments (symbolized by the broad arrows 62a–62o) are all directed in the same (e.g., upward) direction substantially perpendicular to the media layer surface 60a and are all of approximately the same amplitude. The amplitude and direction of the net magnetic moment M is established by the relative amplitudes and direction of the magnetic moment of the individual components of the magneto-optic alloy. Here, the downwardly-directed moment 64a of the transition metal (TM) component of the alloy is of smaller amplitude than the upwardly-directed moment 64b of the rare earth (RE) alloy component, in each subregion.

As a region N receives energy from the overwriting means (laser 14), the temperature of that region is raised until the compensation temperature Tc is exceeded as shown in FIG. 2b. Because the impingent light beam 15 has a substantially Gaussian energy distribution, the entire region N is not uniformly heated. Thus, while the individual alloy component magnetic moments (e.g., moments 64a and 64b) and the net magnetic moments (e.g., net moments 62a, 62b, 62n and 62o) all remain substantially unchanged in subregions removed from the region N receiving energy, those subregions nearer to the heated region N receive energy from the fringes of the beam. Responsive to the increased temperature, which is less than the compensation temperature in these other regions (N−1), (N+1), etc., the magnetic moment 64c of the transition metal TM component is decreased by some amount, which is not as great as the decrease in the magnetic moment 64d of the rare earth RE component; the net moment (e.g., net moments 62c' and 62m') of that subregion is reduced. As the temperature increases, the reduction in the magnitude of the net magnetic moment (e.g., net moments 62d' and 62l') continues, responsive to the faster reduction of the RE moment 64f than the reduction in the TM moment 64e, with closer location to region N. In some subregions the compensation temperature is just attained and the reduced amplitudes of the TM and RE moments 64g and 64h become by definition, equal; the net magnetic moment 62e', 62k', . . . are of zero magnitude (and define the periphery of the region N). Inward of the regions 62 with zero net magnetic moment, the subregion temperature exceeds the compensation temperature; the reduced amplitude of the TM moment (e.g., magnetic moments 64i, 64k, 64m . . . ) is now larger than the reduced amplitude of the RE moment (e.g., magnetic moments 64j, 64l, 64m, 62f–62j' . . . ) are all now reversed, having increasing magnitude but in the opposite direction (e.g., into the recording layer).

The self-demagnetizing field is opposite the magnetization in the center region of FIG. 2b causing the component moment directions to reverse as shown in FIG. 2c. The component moments in subregions within, but adjacent to, the region N periphery remain fixed in the former direction (e.g., as shown by moments 62i and 62j) so that the net moment remains fixed in the new (now inverted) direction. The component moments in the more central subregions, however, are direction reversed to the original direction (e.g., the upward direction, as at net magnetic moments 62g", 62h", 62i", . . . ). As the subregion temperature decreases upon cooling, after removal/off-switching of the light beam, the amplitudes of the alloy component magnetic moments increase to their ambient temperature values; as each subregion passes through the compensation temperature, the net magnetic moment 62 thereof is decreased to zero. As shown in FIG. 2d, in each subregion, at some temperature less than the compensation temperature, the RE magnetic moment (e.g., magnetic moment 64n°) amplitude is again greater than the amplitude of the TM magnetic moment (e.g., magnetic moment 64m°) and the direction of the net moment (e.g., net magnetic moment 62h°) is again in the same inverted direction. The rest of the region N subregions experience the same inversion of their net magnetic moments (e.g., net magnetic moments 62g°, 62i° . . . ). Thus, the subregions of region N all have net magnetic moments aligned in a direction opposite to the alignment direction prior to the heating of the region N to a temperature greater than the compensation temperature. As the opposed moments nucleate a magnetic wall (as at the periphery subregions 66a and 66b upon opposite sides of region N), a stable magnetic domain is created, with diameter D, now storing the new value of the associated data bit.

Referring now to FIGS. 2e–2h, at some later time, a comparison of the data value (e.g., a logic one) stored in the domain and the logic value (e.g., a logic zero) of a new bit of binary data for storage in domain N indicates that the region N must be over-written. This decision enables the write laser diode and causes region N to be again heated, in the absence of any substantial intentional external bias magnetic field, to a temperature in excess of the compensation temperature. The domain wall, as exemplified by wall portions 66a and 66b of FIG. 2e is not abruptly destroyed; there is an inversion of the net magnetic moments 62 of the subregions within region N, due to the reversal of the alloy component magnetic moment dominance Thus, the net magnetic moments 62f"–62j", of those subregions within the heated region N, are not only modified in amplitude by the Gaussian energy distribution of the impinging light beam, but are also inverted in direction, to point upwardly and away from the magneto-optic material layer. The self-demagnetizing field of the immediately-adjacent subregions (i.e., the upwardly directed net moments of the subregions 62f' and 62j") cause a reversal in the local magnetic field in the center subregion(s), as here represented by subregion 62h", of the heated region N, as shown in FIG. 2f, so that at least one of the interior subregions now has the net magnetic moment thereof directed in an again-inverted direction (e.g., the downwardly-directed net magnetic moment 62h" of a smaller, region of diameter D', less than region/domain diameter D, within the larger domain/region N). A second, inner domain wall, as shown by opposed wall portions 68a and 68b, is now present about the subregion periphery. Local wall motion causes the portions of the inner wall to expand to the locations of the associated portions of the outer wall; the two walls meet and mutually annihilate one another, so that the diameter D", of the region in which the net magnetic moments 62g"–62i" (see FIG. 2g) are still inverted, is greater than the domain diameter D'. As the temperature of the region N is decreased to below the compensation temperature, by cooling after cessation of the heating pulse, the relative amplitudes of the RE and TM alloy component magnetic moments change and the subregion net magnetic moments are again all directed in the same direction (e.g., the upward direction for net magnetic moments 62e–62k, of FIG. 2h). The data value stored in region N has, therefore, been inverted (e.g., to a logic one value) from the state of the data value (e.g., the logic zero value) previously stored in that region.

While presently preferred embodiments have been described herein, many modifications and variations should be apparent to those skilled in the art. The scope of the invention is defined in the appended claims and not by the specific details and instrumentalities presented herein as illustrations.

We claim:

1. A method for strip erasing magnetic domains previously recorded along a track on a magneto-optic recording medium comprising:

Providing a thin film layer of ferrimagnetic recording medium having a compensation temperature above 40° C. as said magneto-optic recording medium and a laser;

strip erasing said magnetic domains by applying a laser beam produced by said laser and without requiring an external magnetic bias field or an internal biasing layer, said laser beam providing laser energy for progressively heating a portion along said track for a distance at least 1.5 times the track width to above said compensation temperature;

said laser energy applied to said track being at an energy level insufficient to record new domains of reverse magnetic polarity, but sufficient to erase previously recorded magnetic domains.

2. A method according to claim 1 wherein said ferrimagnetic recording medium has a compensation temperature in the range of 40° C. to 140° C. and a Curie point temperature at least 50° C. above said compensation temperature.

3. The method according to claim 1 wherein said ferrimagnetic recording medium has a compensation temperature in the range of 60° C. to 100° C. and a Curie point temperature at least 100° C. above said compensation temperature.

4. A method according to claim 1 wherein said ferrimagnetic recording medium is a rare earth, transition metal alloy.

5. A method according to claim 4 wherein said ferrimagnetic recording medium is an alloy comprising terbium, iron and cobalt.

6. A method according to claim 4 wherein said ferrimagnetic recording medium is an alloy comprising gadolinium, terbium, iron and cobalt.

7. A method according to claim 4 wherein said ferrimagnetic recording medium is an alloy of terbium cobalt.

8. The method according to claim 1 wherein said progressive heating of the recording medium along said track creates a progressive region of low coercivity which permits magnetic field reversal by a demagnetizing field produced by said recording medium.

9. The method according to claim 1 wherein said laser operates continuously for the duration of a strip erase.

10. The method according to claim 1 wherein said laser is operated to produce closely spaced pulses for the duration of a strip erase.

11. A method for recording elongated domains of reverse magnetic polarity along a track on a magneto-optical recording medium which are erasable by using an erasing laser beam of low energy level comprising:

providing a thin film ferromagnetic layer of rare-earth, transition metal alloy having a compensation temperature in the range of 40° C. to 140° C. and a Curie point temperature at least 50° C. above said compensation temperature as said magneto-optical recording medium;

recording said elengated domains by applying a recording laser beam having a high energy level to said medium to progressively heat at least a portion of said track above said compensation temperature but not above the Curie point temperature to record said elongated domains.

12. A method according to claim 11 wherein said compensation temperature is selected in the range of 60° C. to 100° C. and said Curie point temperature is selected at least 100° C. above said compensation temperature.

13. A method according to claim 11 wherein said ferrimagnetic recording medium is an alloy comprising terbium, iron and cobalt.

14. A method according to claim 11 wherein said ferrimagnetic recording medium is an alloy comprising gadolinium, terbium, iron and cobalt.

15. A method according to claim 11 wherein said ferrimagnetic recording medium is an alloy of terbium cobalt.

16. The method according to claim 11 wherein said laser beam is continuous for the period during which an elongated domain is recorded.

17. The method according to claim 11 wherein said laser beam is pulsed during the period in which an elongated domain is recorded.

18. A method for recording elongated domains of reverse magnetic polarity along a track on a magnetic-optic recording medium and for strip erasing said recorded domains, comprising:

provseing a thin film layer of ferromagnetic recording medium having a compensation temperature above 40° C. as said magneto-optic recording medium;

recording said elongated domain by applying a laser beam movable relatively to said recording medium to progressively heat at least a portion of said track to above said compensation temperature, wherein said laser beam being energized at a higher energy level sufficient to record said elongated domains onto said track of said medium when a recorded domain is desired along said tracks; and strip erasing said recorded domains by applying a laser beam at a lower energy level that is insufficient to record a new domain but sufficient to perform said strip erasing of said recorded domains without requiring an external magnetic field or internal biasing layer for performing said strip erasing.

19. The method according to claim 18 wherein said ferrimagnetic recording medium has a compensation temperature in the range of 40° C. to 140° C. and a Curie temperature at least 50° C. above said compensation temperature.

20. The method according to claim 18 wherein said ferrimagnetic recording medium has a compensation temperature in the range of 60° C. to 100° C. and a Curie temperature at least 100° C. above said compensation temperature.

21. The method according to claims 18 or 20 wherein said laser heats at least said portion of the track above the compensation temperature thereof and below the Curie point.

22. The method according to claim 18 wherein said laser is energized continuously when energized at said higher energy level and at said lower energy level.

23. The method according to claim 18 wherein said laser is pulsed when energized at said higher energy level and at said lower energy level.

24. The method according to claim 18 wherein said laser is energized continuously when energized at said lower energy level and is pulsed when energized at said higher energy level.

25. The method according to claim 18 wherein said laser is energized continuously when energized at said higher energy level and is pulsed when energized at said lower energy level.

26. The method according to claim 25 wherein said laser is operated at a fixed power level and said higher energy level is achieved by continuous operation and said lower energy level is achieved by pulsing said laser.

27. The method according to claims 23, 24, 25 or 26 wherein said laser beam, when pulsed, is pulsed at a frequency above 5 megahertz.

28. A method for recording elongated domains of reverse magnetic polarity along a track on a magneto-optic recording medium and for strip erasing said recorded domains, comprising:

providing a thin film layer of ferrimagnetic recording medium having a compensation temperature above 40° C. and a Curie point as said magneto-optic recording medium;

recording said elongated domains by applying a laser beam movable relative to said recording medium to progressively heat at least a portion of said track to above said compensation temperature and below said Curie point wherein said laser beam being energized at a higher energy level sufficient to record said elongated domains onto said track of said medium when a recorded domain is desired along said tracks; and strip erasing said recorded domains by applying a laser beam at a lower energy level that is insufficient to record a new domain but sufficient to perform said strip erasing of said recorded domains without requiring an external magnetic field and an internal biasing layer for performing said strip erasing;

wherein said laser beam heats at least a portion of said track above the compensation temperature thereof and below said Curie point.

29. A method for recording elongated domains of reverse magnetic polarity along a track on a magneto-optic recording medium and for strip erasing said recorded domains, comprising:

providing a thin film layer of ferrimagnetic recording medium having a compensation temperature in the range of 60° C. to 100° C. and a Curie point that is at least 100° C. above said compensation temperature as said magneto-optic recording medium and a laser;

recording said elongated domains by applying a laser beam produced by said laser and movable relative to said recording medium to progressively heat at least a portion of said track to above said compensation temperature thereof and below said Curie point wherein said laser beam is continuously energized at a higher energy level which is sufficient to record said elongated domains onto said track of said medium when a recording is desired along said track; and strip erasing recorded elongated domains by a laser beam provided by said laser which is intermittently energized at a lower energy level which is insufficient to record a new domain by sufficient to perform said strip erasing of recorded domains without requiring any external magnetic bias or internal biasing layer for performing said strip erasing.

30. A method for recording elongated domains of reverse magnetic polarity along a track on a magneto-optic recording medium and for strip erasing recorded domains comprising:

providing a thin film layer of ferrimagnetic recording medium having a compensation temperature above 40° C. as said magneto-optic recording medium and a laser;

recording said elongated domains by applying a laser beam produced by said laser and movable relative to said recording medium to progressively heat at least a portion of said track to above said compensation temperature, wherein said laser beam is continuously energized at a higher energy level which is sufficient to record elongated domains when a recording is desired along said track; and strip erasing recorded elongated domains by a laser beam provided by said laser which is intermittently energized at a lower energy level which is intermittently energized at a lower energy level which is insufficient to record a new domain but sufficient to perform said strip erasing without requiring an external magnetic bias or an internal biasing layer for performing said strip erasing.

* * * * *